(12) United States Patent
Toussaint et al.

(10) Patent No.: US 9,178,221 B2
(45) Date of Patent: Nov. 3, 2015

(54) ELECTROCHEMICAL DEVICE HAVING A SOLID ALKALINE ION-CONDUCTING ELECTROLYTE AND AN AQUEOUS ELECTROLYTE

(75) Inventors: Gwenaelle Toussaint, Nemours (FR); Philippe Stevens, Noisy Rudignon (FR)

(73) Assignee: Electricite De France, Paris (FR)

( * ) Notice: Subject to any disclaimer, the term of this patent is extended or adjusted under 35 U.S.C. 154(b) by 0 days.

(21) Appl. No.: 13/499,394

(22) PCT Filed: Oct. 21, 2010

(86) PCT No.: PCT/FR2010/052246
§ 371 (c)(1),
(2), (4) Date: Mar. 30, 2012

(87) PCT Pub. No.: WO2011/051597
PCT Pub. Date: May 5, 2011

(65) Prior Publication Data
US 2012/0183868 A1    Jul. 19, 2012

(30) Foreign Application Priority Data

Oct. 27, 2009   (FR) ...................................... 09 57528

(51) Int. Cl.
| H01M 8/22 | (2006.01) |
| H01M 6/18 | (2006.01) |
| H01M 6/24 | (2006.01) |
| H01M 10/26 | (2006.01) |
| H01M 12/06 | (2006.01) |

(52) U.S. Cl.
CPC .............. *H01M 6/185* (2013.01); *H01M 6/187* (2013.01); *H01M 6/24* (2013.01); *H01M 10/26* (2013.01); *H01M 12/06* (2013.01); *H01M 6/188* (2013.01); *H01M 2300/0068* (2013.01); *H01M 2300/0094* (2013.01); *Y02E 60/124* (2013.01)

(58) Field of Classification Search
None
See application file for complete search history.

(56) References Cited

U.S. PATENT DOCUMENTS

| 4,057,675 | A | 11/1977 | Halberstadt et al. |
| 6,485,622 | B1 | 11/2002 | Fu |
| 7,070,632 | B1 * | 7/2006 | Visco et al. ................... 29/623.3 |
| 2008/0038641 | A1 * | 2/2008 | Visco et al. ................... 429/303 |
| 2008/0057386 | A1 * | 3/2008 | Visco et al. ................... 429/137 |
| 2008/0070087 | A1 | 3/2008 | Johnson |
| 2008/0182157 | A1 * | 7/2008 | Visco et al. ..................... 429/50 |

FOREIGN PATENT DOCUMENTS

EP    1 088 796    4/2001

OTHER PUBLICATIONS

PCT International Search Report and Written Opinion received in PCT/FR2010/052246.
West et al. "Chemical stability enhancement of lithium conducting solid electrolyte plates using sputtered LiPON thin films", *Journal of Power Sources*, vol. 126, pp. 134-138 (2004).

* cited by examiner

*Primary Examiner* — Patrick Ryan
*Assistant Examiner* — Jose Colucci Rios
(74) *Attorney, Agent, or Firm* — Vedder Price P.C.; Thomas J. Kowalski; Rebecca G. Rudich

(57) ABSTRACT

The present invention relates to an alkaline cation-conducting ceramic membrane covered, over at least a portion of the surface thereof, with a cation-conducting organic polyelectrolyte layer that is insoluble and chemically stable in pH-basic water. The invention also relates to an electrochemical device including such a membrane as a solid electrolyte in contact with a liquid electrolyte formed of an alkali metal hydroxide aqueous solution.

27 Claims, 2 Drawing Sheets

Figure 1:
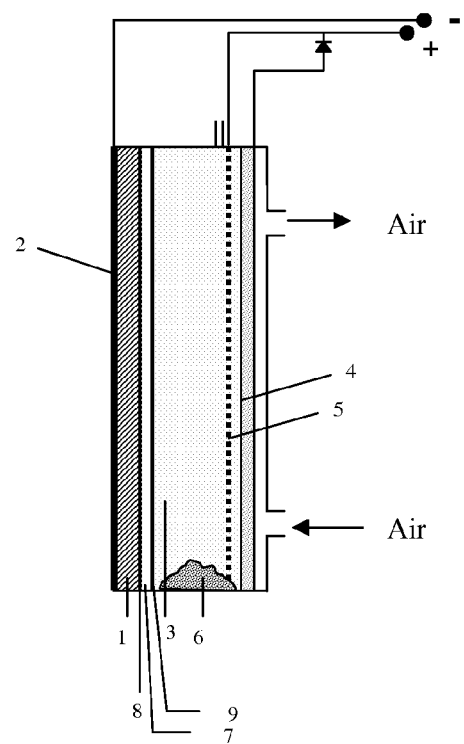

ELECTROCHEMICAL DEVICE HAVING A SOLID ALKALINE ION-CONDUCTING ELECTROLYTE AND AN AQUEOUS ELECTROLYTE

RELATED APPLICATIONS

The present application is filed pursuant to 35 U.S.C. §371 as a U.S. National Phase application of International Patent Application No. PCT/FR2010/052246, which was filed on Oct. 21, 2010, claiming the benefit of priority to French Patent Application No. FR 09 57528 filed on Oct. 27, 2009. The entire content of each of the aforementioned applications is incorporated herein by reference in its entirety.

The present invention relates to an electrochemical device, in particular to a rechargeable battery, comprising both a solid electrolyte membrane that can conduct alkali cations and a saturated aqueous electrolyte, these two electrolytes being separated from each other by an organic polymer film.

The energy density per unit mass (expressed in Wh/kg) of batteries is still the main factor limiting their use in mobile devices such as portable electronics or electric vehicles. The limited energy density of these batteries is mainly due to the performance of the materials from which they are made. The best negative-electrode materials currently available generally have a specific capacity of 300 to 350 Ah/kg. The specific capacity is only about 100 to 150 Ah/kg for positive-electrode materials.

The advantage of metal-air (lithium-air or sodium-air) systems is that the positive electrode has an infinite capacity. The oxygen consumed at the positive electrode does not need to be stored in the electrode but can be obtained from the ambient air. The capacity of the battery then only depends on the capacity of the negative electrode and on the capacity of the battery to store the product of the oxygen reduction, i.e. the lithium or sodium hydroxide formed in the positive-electrode compartment during discharge of the battery.

The air electrode requires a basic or acidic aqueous medium to operate optimally. Unfortunately, the lithium metal or sodium metal used for the negative electrode reacts too strongly with water, and it is impossible for it to form in the presence of water during recharge because water reduces at voltages that are much too low, preventing lithium or sodium metal from forming A waterproof physical barrier is therefore required between the negative-electrode compartment, which is based on lithium or sodium metal, and the positive-electrode compartment containing an aqueous electrolyte. This waterproof physical barrier must however selectively allow metal cations to pass from the aqueous electrolyte to the negative electrode and in the opposite direction.

A family of ceramic materials that meet these requirements, called "Li superionic conductors" (LISICONs) or "Na superionic conductors" (NASICONs), has been known for some time. These materials have advantageously high conductivities ranging up to $1\times10^{-4}$ or even $1\times10^{-3}$ S/cm at 25° C. and have good chemical stability with respect to the aqueous electrolyte in the positive-electrode compartment (air electrode). However, they react very strongly with the lithium or sodium metal in the anode compartment and it is essential to isolate them, in a known way, from the lithium or sodium metal using a protective coating, for example a coating based on a lithium phosphorus oxynitride (LiPON) glass or a sodium phosphorus oxynitride (NaPON) glass.

The first work done to develop a primary, i.e. nonrechargeable, Li-air battery dates from the 1970s (U.S. Pat. No. 4,057,675). These batteries suffered from a high self-discharge rate and a short lifetime due to corrosion (reaction of the lithium with water). A battery composed of six modules and delivering 1.2 kW of power was nevertheless produced (W. R. Momyer et al. (1980), Proc. 15$^{th}$ Intersoc. Energy Convers. Eng. Conf., page 1480). A rechargeable Li/O$_2$ battery without an aqueous phase, employing an electrolyte made of a polymer containing a lithium salt, was also produced (K. M. Abraham et al. (1996), J. Electrochem. Soc. 143(1), pages 1-5). Employing a porous carbon-based positive electrode in this cell gave good results in terms of oxygen reduction, but this electrode was not suited to oxidation during recharge. It was possible to implement only three cycles and, to the knowledge of the Applicant, no other work was published. Finally, more recently, the company PolyPlus reported obtaining a good performance with a nonrechargeable Li-metal/water battery using a LISICON-based separator (S. J. Visco et al., Proc. 210th Meeting of the Electrochem. Soc., (2006), page 389).

As explained above, one of the factors limiting the capacity of rechargeable metal-air batteries is their ability to store the alkali-metal hydroxide formed, during discharge of the battery, by reduction of oxygen in the positive-electrode compartment ($O_2+4e^-+2H_2O\rightarrow4OH^-$), oxidation of the alkali metal in the negative-electrode compartment ($4Li\rightarrow4Li^++4e^-$) and migration of the alkali-metal ions thus formed into the positive-electrode compartment.

The concentration of alkali-metal hydroxide in the aqueous electrolyte therefore increases during discharge of the battery, and decreases during charging of the battery when the alkali ions migrate again into the negative-electrode compartment, to be reduced therein, and the hydroxyl ions are oxidized at the oxygen-evolving electrode (the positive electrode acting during charging of the battery).

In order for the battery to have the highest possible capacity per unit weight, it is desirable to greatly limit the volume of aqueous electrolyte and to use solutions that are as concentrated as possible. In theory, there is no reason why the alkali-metal-hydroxide concentration should not reach and exceed the saturation concentration (5.2M of LiOH at 20° C.), above which limit the alkali-metal hydroxide precipitates. Formation of a precipitate is in principle not a problem because when the battery is recharged, the precipitate can dissolve again and liberate lithium or sodium ions. The alkali-metal-hydroxide precipitate is thus an advantageous store of lithium or sodium ions.

However, the Applicant, in the context of research aiming to continuously improve the performance of rechargeable metal-air batteries, has in fact observed a very substantial increase in the cationic resistance of the system, at the interface between the solid electrolyte membrane and the aqueous electrolyte, when the alkali-metal hydroxide precipitates in the aqueous electrolyte. This spectacular and highly undesirable drop in the cationic conductivity has been attributed to a dense crystalline layer of alkali-metal hydroxide (LiOH or NaOH) forming on the surface of the solid electrolyte membrane, which layer does not conduct cations. This problem is particularly significant and acute for lithium hydroxide, which has a solubility in water at 20° C. of about only 5.2 mole/liter. It is less of a problem for sodium hydroxide, which has a water solubility about five times higher than that of lithium hydroxide.

The present invention is based on the discovery that the undesirable formation of such a dense crystalline layer of LiOH or, to a lesser extent of NaOH, at the solid electrolyte/aqueous electrolyte interface, may be totally prevented by placing a thin layer of an appropriate organic polymer at this interface.

Therefore, one subject of the present invention is a ceramic membrane that can conduct alkali cations and is covered, over at least part of at least one of its surfaces, with a layer of an organic cation-conductive polyelectrolyte, said layer being insoluble and chemically stable in water at basic pH, even very basic pH, i.e. water with a pH higher than 14.

The ceramic membrane that can conduct alkali cations is preferably a ceramic membrane that can conduct sodium ions or lithium ions, preferably lithium ions. Such ceramic membranes that can conduct metal ions are known and sold, for example, as *Lithium-ion Conducting Glass-ceramics* (LICGC) by Ohara Inc. (Japan). These glass ceramics are ceramics with the chemical formula $Li_{1+x}(M,Ga,Al)_x(Ge_{1-y}Ti_y)_{2-x}(PO_4)_3$ where M represents one or more metals chosen from Nd, Sm, Eu, Gd, Tb, Dy, Ho, Er, Tm and Yb, and where $0<x\leq0.8$ and $0\leq y\leq1.0$. Ceramic membranes of this type are also known in the literature as lithium superionic conductors (LISICONs).

Ceramics that can conduct sodium ions are for example materials with the chemical formula $Na_{1+x}Zr_2Si_xP_{3-x}O_{12}$ where $0\leq x\leq3$.

These ceramics that can conduct metal ions are especially described in U.S. Pat. No. 6,485,622 and in the article by N. Gasmi et al., *J. of Sol-Gel Science and Technology* 4(3), pages 231-237, and are known in the literature as Na superionic conductors (NASICONs).

The thickness of the ceramic membrane that can conduct alkali-metal cations depends on the area of the membrane. The larger the area of the latter, the thicker the ceramic must be to be able to withstand the mechanical stresses. However, in electrochemical devices it is generally sought to use, as far as is possible, thin solid electrolytes.

This is because electrical efficiency, of a cell or a battery for example, is in part governed by the resistance of the electrolyte. This specific resistance (R) is expressed by the formula:

$$R=(r\times e)/A$$

where r denotes the resistivity of the electrolyte, e its thickness and A its area. In other words, the smaller the thickness e of the electrolyte, the higher the energy efficiency of the device will be.

The solid electrolyte membrane used in the present invention is advantageously from 30 μm to 500 μm in thickness and preferably from 50 μm to 160 μm in thickness. For areas significantly larger than a few cm² the thickness of the membrane must, as a consequence, be increased, or else the membrane must be strengthened and supported by a reinforcing structure, for example resin strips or a resin grid bonded to one or both sides of the membrane and leaving as much of the area of the latter free as possible, i.e. at least 80% and preferably at least 90% of the area of the solid electrolyte membrane.

This ceramic membrane is coated, on at least one of its surfaces, with a layer of an organic cation-conductive polymer, the polymer being insoluble in water at basic pH and chemically stable at basic pH.

The expression "organic cation-conductive polymer" or "organic cation-conductive polyelectrolyte" is, in the present invention, understood to mean a polymer comprising a plurality of electrolyte groups. When such a polymer is brought into contact with water, the electrolyte groups dissociate and negative charge, associated with cations (counterions), appears on its backbone. The charge on the polymer depends on the number of electrolyte groups present and on the pH of the solution.

Such a cation-conductive polyelectrolyte therefore has an intrinsic ability to conduct cations and must be differentiated from solid electrolytes based on salt-impregnated polymers, such as the electrolytes of lithium-metal-polymer (LMP) batteries, for example, which consist of a neutral polymer, such as polyethylene oxide, impregnated with a lithium salt. These LMP-battery electrolytes would indeed be inappropriate for the application envisioned in the present invention because they are water soluble and chemically unstable in highly basic media.

Such organic cation-conductive polymers are known and are typically used in polymer electrolyte membrane fuel cells (PEMFC), or for chlorine/sodium hydroxide electrolysis, where they are used as a solid electrolyte.

The expression "polymer stable in water at basic pH" is, in the present invention, understood to mean a polymer that, when it is immersed in water of pH 14 at 50° C., exhibits no detectable chemical degradation and no drop in ionic conductivity.

As explained above, this polymer, which is insoluble and stable in water at basic pH, is a polyacid polyelectrolyte bearing a number of negatively charged groups (anions). It is these negatively charged groups, attached to the polymer backbone and associated with cationic counterions, which are indeed responsible for the cationic conductivity of the polymer layer covering the ceramic.

The organic polymer must be sufficiently conductive of $Li^+$ or $Na^+$ ions, but there is no need for it to be selective regarding a particular type of cation, this selectivity being ensured by the underlying cation-conductive ceramic.

In order for the cationic conductivity of the organic polymer to be high enough, its equivalent weight (average molar mass per negatively charged group) must be low enough. This is because the lower the equivalent weight, the greater the ion-exchange capacity of the polymer. Generally, polymers having an acid-group equivalent weight higher than 2000 g/mol, preferably 1800 g/mol, should not be used.

The equivalent weight must not however be too low because, if the concentration of negative charge is too high, there is a risk that the polymer will become soluble in water and in the aqueous electrolyte. It is however difficult, even impossible, to define a lower limit for the equivalent weight of the polymer. Specifically, it should be understood that the lower limit of the equivalent weight range depends, inter alia, on the chemical nature of the polymer and in particular on the hydrophobicity of the uncharged comonomers. Specifically, a polymer with a very hydrophobic backbone can remain water insoluble while having a lower equivalent weight than a polymer with a less hydrophobic backbone. A person skilled in the art will have no problem setting the equivalent weight of the polymer to the lowest possible value that, however, preserves its water insolubility. The acid-group equivalent weight of the organic polymer preferably lies between 600 and 1800 g/mol, in particular between 700 and 1500 g/mol.

The organic polymer is preferably an organic halopolymer, and in particular a fluoropolymer is preferred. As indicated above, this polymer must bear acid groups. These acid groups may be strong or weak acids, the generally very high pH of use ensuring a sufficiently high dissociation rate for weak acids.

Mention may be made, by way of particularly preferred example, of a copolymer of tetrafluoroethylene and a comonomer bearing an acid group, preferably a polymer with the chemical formula:

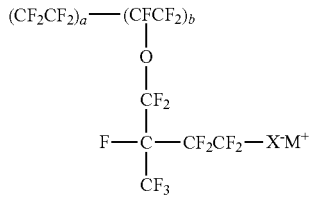

where X represents a —COO⁻ group or an —SO$_3^-$ group, preferably an —SO$_3^-$ group, and M⁺ represents a proton or a metal cation.

Such preferred polymers are known and have been commercially available for many years under the trade name Nafion®. Dispersions or solutions of this polymer may be uniformly deposited on ceramic membranes, for example by spraying, dip coating, spin coating, roll coating or brush coating. After the solvent phase has been evaporated, the polymer-coated ceramic is preferably subjected to a heat treatment, for example for one hour at about 150° C. in air, with the aim of stabilizing the polymer layer. After deposition, the polymer is in protonic form. The protons will be exchanged with Li⁺ or Na⁺ ions during immersion in sodium or lithium hydroxide solutions.

For copolymers of tetrafluoroethylene and an acid comonomer, such as described above, the acid-group equivalent weight preferably lies between 1000 and 1200 g/mol.

The thickness of the organic polymer layer after deposition, drying and an optional heat treatment generally lies between 1 and 50 μm, preferably between 2 and 20 μm, and in particular between 2 and 10 μm. The polymer layer must be thick enough to be stable and cover the membrane and it must effectively prevent crystallization of the alkali-metal hydroxide. Larger thicknesses, i.e. larger than 50 μm, could certainly be envisioned, but would have the disadvantage of undesirably increasing the resistance of the organic polymer layer.

In one embodiment of the ceramic membrane of the present invention, the organic cation-conductive polymer that is insoluble and chemically stable in water at basic pH only covers one of the two surfaces of the ceramic membrane, and the other surface is covered with a protective coating based on Li$_3$N, Li$_3$P, LiI, LiBr, LiF or lithium phosphorus oxynitride (LiPON) or based on sodium phosphorus oxynitride (NaPON), the coating preferably being a LiPON or NaPON coating. This coating protects the membrane from being attacked by the negative-electrode materials. Such a three-layer sandwich structure (protective coating/ceramic membrane/organic polymer) will in particular be used in metal-air or metal-water cells or batteries where the solid electrolyte, i.e. the ceramic membrane, must be isolated from the alkali metal of the negative-electrode compartment.

The ceramic membrane described above that can conduct alkali cations and that is coated with an organic cation-conductive polymer layer may in principle be employed in all electrochemical devices employing a solid electrolyte and a liquid aqueous electrolyte containing a high concentration of a compound liable to crystallize on the surface of the ceramic membrane if the latter is not covered with the polymer.

Therefore, another subject of the present invention is an electrochemical device containing:

as a solid electrolyte, a ceramic membrane that can conduct alkali cations, the membrane being covered with an organic cation-conductive polymer that is insoluble and chemically stable in water at basic pH, as described above; and as a liquid electrolyte, an aqueous solution of alkali-metal hydroxide making contact with said organic polymer.

This electrochemical device is preferably a rechargeable or nonrechargeable metal-air or metal-water battery, preferably a rechargeable or nonrechargeable lithium-air or lithium-water battery.

A lithium-air battery according to the present invention comprises:

a negative-electrode compartment containing lithium metal;

a positive-electrode compartment comprising at least one positive air electrode immersed in an aqueous solution of lithium hydroxide; and a solid electrolyte separating, in a gas-tight and watertight manner, the negative-electrode compartment from the positive-electrode compartment, said solid electrolyte being a ceramic membrane, according to the present invention, covered on one of its surfaces (the surface turned toward the positive-electrode compartment) with a an organic cation-conductive polymer that is insoluble and chemically stable in water at basic pH and, optionally if necessary, covered on the other surface (the surface turned toward the negative-electrode compartment) with a protective coating based on Li$_3$N, Li$_3$P, LiI, LiBr, LiF or lithium phosphorus oxynitride (LiPON), the coating preferably being a based on LiPON The lithium-air battery, when it is a rechargeable battery, preferably furthermore comprises an oxygen-emitting positive electrode (which is active during recharge of the battery), immersed, as the air electrode is, in the aqueous electrolyte.

A lithium-water battery according to the present invention differs from a lithium-air battery simply in the fact that the air electrode, active during discharge, is replaced with a hydrogen-emitting positive electrode that catalyzes the reduction of water according to the reaction:

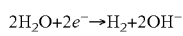

$$2H_2O + 2e^- \rightarrow H_2 + 2OH^-$$

The electrochemical device of the present invention may also be an electrolysis cell comprising a negative-electrode compartment and a positive-electrode compartment, the two compartments (half-cells) being separated from each other by a ceramic membrane, according to the invention, that can conduct alkali cations. Such an electrolysis cell may be used, for example, to recover, from a lithium or sodium salt, lithium or sodium hydroxide and the acid corresponding to the anion of said salt. To do this, an aqueous solution of the salt in question, for example Li$_2$SO$_4$, is introduced into the positive-electrode compartment and a potential is applied between the two electrodes. At the end of the electrolysis reaction the positive-electrode compartment will contain a sulfuric acid solution and the negative-electrode compartment will contain an LiOH solution and possibly an LiOH precipitate. In this embodiment of the device of the present invention, the membrane that can conduct alkali cations is covered with organic polymer at least on its face turned toward the negative-electrode compartment.

Finally, the electrochemical device may be a lithium pump or a sodium pump, i.e. an electrochemical device allowing lithium, preferably in the form of solid LiOH, or sodium, preferably in the form of solid NaOH, to be selectively recovered and concentrated from a diluted or polluted aqueous solution. Such a lithium or sodium pump has a structure identical to that of an electrolysis cell, such as described above, but functions differently because the solutions introduced into the negative- and positive-electrode compartments are different. A diluted or polluted solution containing the alkali cation in question is introduced into the positive-electrode compartment and a voltage is applied between the two electrodes. At the end of the electrochemical reaction, all the alkali cations are in the alkali-metal-hydroxide form (LiOH or NaOH) in the negative-electrode compartment. As for the electrolysis cell described above, the surface of the ceramic membrane turned towards the negative-electrode compartment is where the lithium or sodium hydroxide will accumulate and it is this surface that must be covered with organic polymer.

Figure 2:
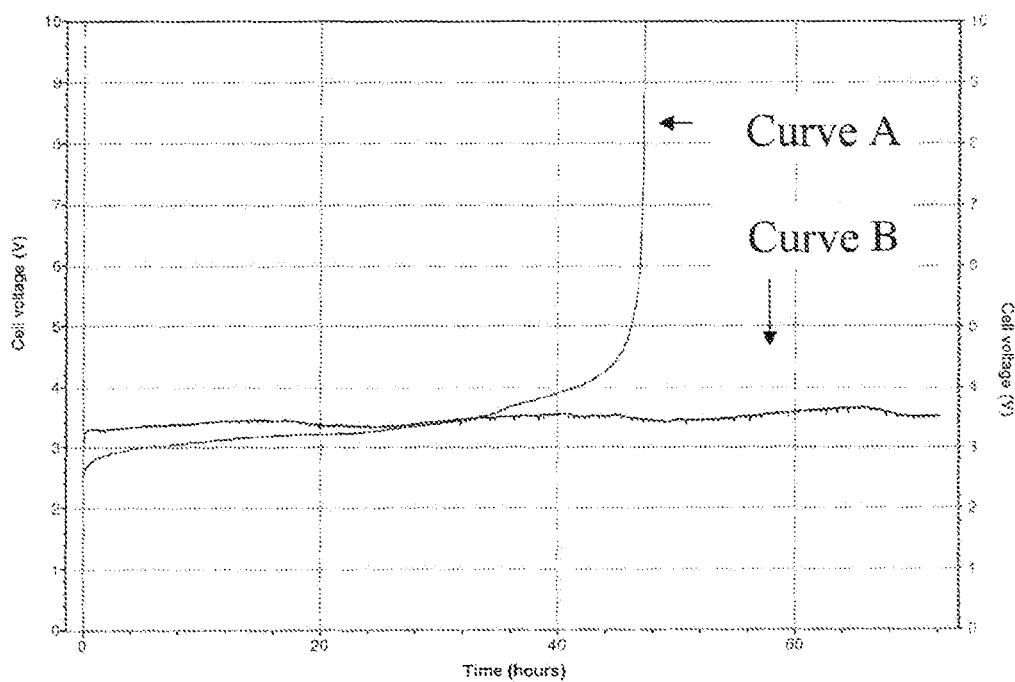

The present invention is illustrated below using the appended figures, in which:

FIG. 1 shows the structure of a lithium-air battery according to the invention; and FIG. 2 shows how the voltage required to maintain a current of 2 mA, in the trials described in the example below, varied over time.

In FIG. 1, the negative-electrode compartment comprises a negative electrode 1 made of lithium metal and connected to an electronic conductor 2. The positive-electrode compartment comprises a liquid electrolyte 3 consisting of a saturated LiOH solution, in which an air electrode 4 and an oxygen-emitting electrode 5 are immersed. An LiOH precipitate 6 accumulates at the bottom of the positive-electrode compartment. The two compartments are separated from each other by a ceramic membrane 7 covered, on the negative-electrode side, by an LiPON-based protective coating 8, and, on the positive-electrode side, with a layer of an organic cation-conductive polymer 9 that is water insoluble. The coating 8 serves to isolate the ceramic membrane from the lithium metal whereas the organic polymer layer 9 prevents a layer of crystallized LiOH from forming on the surface of the ceramic membrane 7.

EXAMPLE

To demonstrate the effect of placing a thin layer of hydrophobic, cation-conductive, organic polymer on the surface of a ceramic electrolyte membrane an electrochemical device was prepared comprising two compartments separated from each other by a ceramic membrane that could conduct Li+ ions (LISICON membrane); the membrane was 300 μm thick and was sold by Ohara. The two compartments were filled with an aqueous solution of 5M LiOH. A platinum electrode was inserted into each compartment. Using a potentiostat, a 2 mA current was made to flow through the cell between the two platinum electrodes, thereby causing Li+ ions to pass from the anode compartment to the cathode compartment. The Li+ ion migration was accompanied by the formation of OH− ions in the positive-electrode compartment by water or oxygen reduction. The positive-electrode compartment of this device mimicked the operation of the positive-electrode compartment of a lithium-water or lithium-air battery at the interface between the LISICON ceramic and the LiOH-containing aqueous electrolyte. The 2 mA current flow was maintained until LiOH saturation and precipitation occurred, and the voltage required to maintain a 2 mA current flow was measured throughout the experiment.

After about 45 hours of operation, at the moment when LiOH started to precipitate, a rapid and significant increase in the voltage required to maintain a current of 2 mA was observed (see Curve A in FIG. 2).

A visual analysis of the LISICON ceramic membrane showed that a dense layer of LiOH crystals had formed on the surface of the membrane exposed to the saturated electrolyte in the positive-electrode compartment.

The same experiment was carried out with a LISICON ceramic membrane identical to the first but covered, on the surface exposed to the positive electrode, with a Nafion® layer.

Curve B in FIG. 2 shows the variation in the voltage required to maintain a current of 2 mA. It will be seen that no increase in the voltage was observed when LiOH began to precipitate in the positive-electrode compartment. LiOH crystals were indeed observed to form in the positive-electrode compartment, but these precipitated crystals dropped to the bottom of the compartment and were not deposited on the surface of the Nafion® layer covering the LISICON ceramic membrane.

The invention claimed is:

1. An electrochemical device comprising:
   a solid, ceramic membrane electrolyte
   a liquid aqueous solution of alkali-metal hydroxide electrolyte,
   wherein
   the ceramic membrane electrolyte is from 30 μm to 500 μm in thickness,
   the ceramic membrane electrolyte conducts Li+ ions,
   at least a first surface of the ceramic membrane covered with an organic cation-conductive halopolymer layer, wherein the ceramic electrolyte membrane does not contact the liquid electrolyte over the entire first surface of the ceramic electrolyte membrane,
   wherein said halopolymer layer is between 1 and 50 μm in thickness, insoluble and chemically stable in water at a basic pH, in contact with the liquid aqueous solution of alkali metal hydroxide electrolyte.

2. The electrochemical device as claimed in claim 1, wherein the solid ceramic membrane has the chemical formula:

$Li_{1+x}(M,Ga,Al)_x(Ge_{1-y}Ti_y)_{2-x}(PO_4)_3$, where M is one or more metals chosen from Nd, Sm, Eu, Gd, Tb, Dy, Ho, Er, Tm and Yb, and
where 0<x<0.8 and 0<y<1.0.

3. The electrochemical device as claimed in claim 1, wherein the halopolymer has the formula:

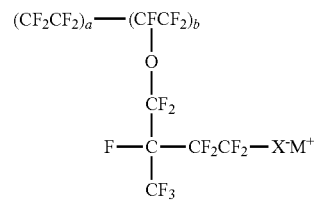

where X represents a —COO− group or an —SO3− group and M+ represents a proton or a metal cation.

4. The electrochemical device as claimed in claim 1, wherein the halopolymer is a copolymer of tetrafluoroethylene and a comonomer bearing acid group(s).

5. The electrochemical device of claim 4, wherein the acid group has a formula —SO3−M+ wherein M is a metal cation or proton.

6. The electrochemical device of claim 1, wherein the halopolymer layer is from 2 to 10 μm in thickness.

7. The electrochemical device as claimed in claim 1, wherein the second surface of the ceramic electrolyte membrane is covered with a protective coating comprising $Li_3N$, $Li_3P$, LiI, LiBr, LiF or lithium phosphorus oxynitride (LiPON).

8. The electrochemical device as claimed in claim 1, wherein the device is a lithium-air battery.

9. The electrochemical device as claimed in claim 1, wherein the device is a lithium-water battery.

10. The electrochemical device as claimed in claim 1, wherein the device is an electrolysis cell.

11. The electrochemical device as claimed in claim 1, wherein the device is a lithium pump.

12. The electrochemical device as claimed in claim 1, wherein the ceramic membrane electrolyte is from 50 μm to 160 μm in thickness.

13. The electrochemical device as claimed in claim 1, wherein the second surface of the ceramic membrane is covered with LiPON protective coating.

14. A method for preventing formation of a dense crystalline layer of LiOH at the solid electrolyte/aqueous electrolyte interface, comprising preparing an electrochemical device comprising:
 a solid, ceramic membrane electrolyte and
 a liquid aqueous solution of alkali-metal hydroxide electrolyte,
 wherein
 the ceramic membrane electrolyte is from 30 μm to 500 μm in thickness,
 the ceramic membrane electrolyte conducts $Li^+$ ions,
 at least a first surface of the ceramic electrolyte membrane covered with an organic cation-conductive halopolymer layer, and
 wherein said halopolymer layer is between 1 and 50 μm in thickness, insoluble and chemically stable in water at a basic pH, and in contact with the liquid aqueous solution of alkali metal hydroxide electrolyte.

15. A method for preventing formation of a dense crystalline layer of LiOH at the solid electrolyte/aqueous electrolyte interface, comprising in an electrochemical device comprising:
 a solid, ceramic membrane electrolyte and
 a liquid aqueous solution of alkali-metal hydroxide electrolyte,
 wherein
 the ceramic membrane electrolyte is from 30 μm to 500 μm in thickness, and
 the ceramic membrane electrolyte conducts $Li^+$ ions,
 wherein the method comprises covering
 at least a first surface of the ceramic electrolyte membrane with an organic cation-conductive halopolymer layer, wherein the ceramic electrolyte membrane does not contact the liquid electrolyte over the entire first surface of the ceramic electrolyte membrane,
 and
 wherein said halopolymer layer is between 1 and 50 μm in thickness, insoluble and chemically stable in water at a basic pH, is in contact with the liquid aqueous solution of alkali metal hydroxide electrolyte and conducts cations between said liquid aqueous solution of alkali-metal hydroxide electrolyte and said ceramic membrane electrolyte.

16. The method of claim 14 or 15 wherein in the electrochemical device, the solid ceramic membrane has the chemical formula:

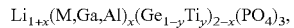

where M is one or more metals chosen from Nd, Sm, Eu, Gd, Tb, Dy, Ho, Er, Tm and Yb, and
 where 0<x<0.8 and 0<y<1.0.

17. The method of claim 14 or 15 wherein the halopolymer has the formula:

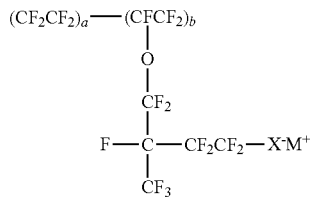

where X represents a —$COO^-$ group or an —$SO3^-$ group and $M^+$ represents a proton or a metal cation.

18. The method of claim 14 or 15 wherein the halopolymer is a copolymer of tetrafluoroethylene and a comonomer bearing acid group(s).

19. The method claim 18, wherein the acid group has a formula —$SO3^-M^+$ wherein M is a metal cation or proton.

20. The method of claim 14 or 15 wherein the halopolymer layer is from 2 to 10 μm in thickness.

21. The method of claim 14 or 15 wherein the second surface of the ceramic electrolyte membrane is covered with a protective coating comprising $Li_3N$, $Li_3P$, LiI, LiBr, LiF or lithium phosphorus oxynitride (LiPON).

22. The method of claim 14 or 15 wherein the device is a lithium-air battery.

23. The method of claim 14 or 15 wherein the device is a lithium-water battery.

24. The method of claim 14 or 15 wherein the device is an electrolysis cell.

25. The method of claim 14 or 15 wherein the device is a lithium pump.

26. The method of claim 14 or 15 wherein the ceramic membrane electrolyte is from 50 μm to 160 μm in thickness.

27. The method of claim 14 or 15 wherein the second surface of the ceramic membrane is covered with LiPON protective coating.

* * * * *